United States Patent
Snow, Jr. et al.

(10) Patent No.: US 9,782,714 B2
(45) Date of Patent: Oct. 10, 2017

(54) STORED GAS PRESSURE RECOVERY SYSTEM

(71) Applicant: The Boeing Company, Chicago, IL (US)

(72) Inventors: Donald Ray Snow, Jr., Fountain Valley, CA (US); Anthony J. Banker, Long Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 397 days.

(21) Appl. No.: 14/617,454

(22) Filed: Feb. 9, 2015

(65) Prior Publication Data
US 2016/0228807 A1 Aug. 11, 2016

(51) Int. Cl.
*B01D 53/02* (2006.01)
*B01D 51/10* (2006.01)
*F02C 1/02* (2006.01)
*B64D 37/32* (2006.01)
*F02C 6/16* (2006.01)
*B01D 53/00* (2006.01)

(52) U.S. Cl.
CPC ............ *B01D 51/10* (2013.01); *B64D 37/32* (2013.01); *F02C 1/02* (2013.01); *F02C 6/16* (2013.01); *B01D 53/00* (2013.01); *B01D 2256/10* (2013.01); *B01D 2257/104* (2013.01); *B01D 2259/4575* (2013.01); *Y02E 60/15* (2013.01)

(58) Field of Classification Search
CPC .......... B01D 2256/10; B01D 2257/104; B01D 2259/4575; B01D 51/10; B01D 53/00; B64D 37/32; F02C 1/02; F02C 6/16; Y02E 60/15
See application file for complete search history.

(56) References Cited

U.S. PATENT DOCUMENTS

| | | | | |
|---|---|---|---|---|
| 6,293,084 B1* | 9/2001 | Drnevich | ............... | B01D 53/22 60/39.17 |
| 6,623,714 B2* | 9/2003 | Shreiber | ................ | B01D 53/22 423/219 |
| 6,913,636 B2* | 7/2005 | Defrancesco | ............ | A62B 7/14 95/130 |
| 7,048,231 B2* | 5/2006 | Jones | ..................... | B64D 37/32 244/135 A |

(Continued)

*Primary Examiner* — Christopher P Jones
(74) *Attorney, Agent, or Firm* — MH2 TECHNOLOGY LAW GROUP, LLP

(57) ABSTRACT

A system and method for storing nitrogen-enriched air (NEA) comprising an air separation device (ASM) and producing NEA in the ASM. One example implementation may include bleed air being supplied to a pressure intensifier. The pressure intensifier is powered by NEA compressed by a first compressor, and the pressure of the bleed air is increased by the pressure intensifier and supplied to an ASM. In another example implementation, a turbine may be drivingly connected to a second compressor and the bleed air supplied to the second compressor. The NEA compressed by the first compressor is supplied to and drives the turbine, which drives the second compressor, and the air compressed by the second compressor is supplied to the ASM. In another example implementation, a turbine may drive an electric generator, which in turn may power an electric motor that drives the second compressor.

20 Claims, 5 Drawing Sheets

(56) References Cited

U.S. PATENT DOCUMENTS

| | | | | |
|---|---|---|---|---|
| 7,081,153 B2* | 7/2006 | Leigh | ............... | B01D 53/0454 |
| | | | | 95/130 |
| 7,625,434 B2* | 12/2009 | Tom | ............... | B01D 53/0446 |
| | | | | 244/135 R |
| 7,845,188 B2* | 12/2010 | Brutscher | ............ | B64D 37/32 |
| | | | | 244/53 R |
| 8,500,878 B2* | 8/2013 | Cremers | ............... | B64D 13/06 |
| | | | | 244/135 R |
| 2004/0112220 A1* | 6/2004 | Defrancesco | ............ | A62B 7/14 |
| | | | | 96/108 |
| 2010/0064886 A1* | 3/2010 | Surawski | ............ | B64D 37/32 |
| | | | | 95/17 |
| 2014/0331857 A1* | 11/2014 | Massey | ............... | B64D 37/32 |
| | | | | 95/8 |

* cited by examiner

STORED GAS PRESSURE RECOVERY SYSTEM

TECHNOLOGICAL FIELD

The present disclosure relates generally to the recovery of energy during the expansion of gas, and in particular, to a system and method for the recovery of energy of the gas as such gas expands between compression and storage thereof onboard a vehicle such as an aircraft.

BACKGROUND

Stored gas on-board inert gas generating systems (OBIGGS) find use in aircraft for rendering onboard fuel tanks relatively inert through introduction of a gas such as nitrogen-enriched air, thereby, potentially reducing the risk of explosion and improving safety on such aircraft. In a stored gas OBIGGS, aircraft engine bleed air and/or air from an auxiliary power unit (APU) may be supplied to an air separation module (ASM) that creates nitrogen-enriched air (NEA), while exhausting the oxygen-rich waste gas overboard. The NEA generation rate is often higher than needed by the aircraft during climbing and cruising, but significantly lower than needed during for the aircraft's descent. Therefore, the surplus NEA produced during climbing and cruising may be compressed by an on-board compressor, such as a multi-staged compressor, and stored in high pressure storage containers. The stored NEA may then be supplied to the fuel tanks at the rate generally needed for various phases of flight, such as during the aircraft's descent.

However, issues may arise in an OBIGGS in that during engine idle and APU operations, the pressure of the incoming air to the ASM may be significantly lower than the ASM's pressure regulator setting, with the NEA mass flow rate being proportionally reduced. The pressure stages in the storage compressor may not be well balanced at such lower incoming air pressures. Consequently, operation of an OBIGGS under low compressor inlet pressure conditions may result in increased compressor vibration and reduced compressor life.

Therefore, it may be desirable to have a system and method that takes into account at least some of the issues discussed above, as well as possibly other issues.

BRIEF SUMMARY

The following is a non-exhaustive list of examples, which may or may not be claimed, of the subject matter according the present disclosure.

According to one aspect of example implementations of the present disclosure, systems and methods are provided to at least partially recover energy lost when the NEA expands between a storage compressor discharge and NEA storage containers. Such energy may be used to boost the inlet pressure to the ASM when such inlet pressure is less than a pressure regulator set point, while requiring little if any additional energy beyond that already allocated to the storage system. Such an example implementation could include a pressure intensifier, a turbo-compressor, or an electrical generator/alternator that is turbine-powered by the NEA passing between the storage compressor and the NEA storage containers. In the implementation comprising an electrical generator/alternator, electricity generated by the generator/alternator powers a motor-driven second compressor upstream of the ASM. An example implementation could include such arrangement being a separate component or integrated into either the storage compressor or ASM, and the pressure recovery configuration could be electronically controlled to become operational only when the inlet pressures at the ASM and/or the storage compressor are low, or could be provided with check valves to automatically shut off when the ASM inlet pressure is close to the ASM pressure regulator set point.

Since the NEA expands as it is passes through the pressure intensifier, turbo-compressor, or turbine-powered electrical generator/alternator, the NEA will cool down. The compressed incoming air may heat up, and a heat exchanger may be added to the system to cool the compressed in coming air and warm the expanded NEA. By using the energy from the NEA that exits the storage compressor, the inlet pressure to the ASM can be raised to increase the pressurization rate and potentially improve reliability of the storage compressor without requiring a significant amount of additional energy. The efficiency of such pressure boost being given to the incoming air may decrease as the storage containers fill, but in the context of use of such system on an aircraft, the storage containers are often at low pressures when the aircraft is on the ground, and, depending on how long the aircraft is on the ground, the storage containers may at times not fully pressurize. Generally, the NEA flow rate from the ASM will be significantly lower than the ASM inlet air flow rate, because the oxygen-rich component is exhausted overboard from the aircraft. Although the NEA stream could potentially be pressurized after the NEA exits the ASM, because such arrangement could cause a higher NEA flow with low ASM inlet pressure, this, in turn, could result in poor NEA oxygen concentration. By pressurizing the entire inlet air stream, the ASM may operate more like normal in-flight operations.

Accordingly, apparatuses and methods intended to address the above concerns would find utility.

The following is a non-exhaustive list of examples, which may or may not be claimed, of the subject matter according the present disclosure.

According to one aspect of example implementations of the present disclosure, a system is set forth for creating nitrogen-enriched air from an incoming air flow, the system comprising an air separation device that receives the incoming air and produces nitrogen-enriched air therefrom, and a first compressor in fluid communication with the air separation device that receives and compresses the nitrogen-enriched air produced by the air separation device. A pressure intensifier is provided in fluid communication with the air separation device, wherein the pressure intensifier is powered by the compressed nitrogen-enriched air, and the pressure intensifier compresses the incoming air prior to such incoming air being received by the air separation device.

According to another aspect of example implementations of the present disclosure, a system is set forth for creating nitrogen-enriched air from an incoming air flow, the system comprising an air separation device that receives the incoming air and produces nitrogen-enriched air therefrom, and a first compressor in fluid communication with the air separation device that receives and compresses the nitrogen-enriched air produced by the air separation device. A second compressor in fluid communication with the air separation device is provided as is also a turbine in fluid communication with the first compressor and drivingly connected to the second compressor, wherein the compressed nitrogen-enriched air drives the turbine, the turbine drives the second compressor, and the second compressor compresses the incoming air prior to such incoming air being received by the air separation device.

According to yet another aspect of example implementations of the present disclosure, a system is set forth creating nitrogen-enriched air from an incoming air flow, the system comprising an air separation device that receives the incoming air and produces nitrogen-enriched air therefrom, and a first compressor in fluid communication with the air separation device that receives and compresses the nitrogen-enriched air produced by the air separation device. A second compressor in fluid communication with the air separation device is provided as is also an electric motor drivingly connected to the second compressor, an electrical generator, and a turbine in fluid communication with the first compressor and drivingly connected to the generator, wherein the compressed nitrogen-enriched air drives the turbine, the turbine drives the generator, the generator electrically powers the motor, the motor drives the second compressor, and the second compressor compresses the incoming air prior to such incoming air being received by the air separation device.

According to a further aspect of example implementations of the present disclosure, a method is set forth for storing nitrogen-enriched air, comprising providing an air separation device and producing nitrogen-enriched air in the air separation device, providing a first compressor and supplying the nitrogen-enriched air to the first compressor, and compressing the nitrogen-enriched air with the first compressor. The method may further comprise providing a second compressor, supplying air to the second compressor, powering the second compressor by supplying thereto the nitrogen-enriched air compressed by the first compressor, and using the second compressor, compressing the air supplied thereto and supplying the air compressed by the second compressor to the air separation device. In some example implementations, the providing of the second compressor may include providing a pressure intensifier. In some example implementations, the method may include providing a turbine drivingly connected to the second compressor, supplying the nitrogen-enriched air compressed by the first compressor to the turbine, driving the turbine with the nitrogen-enriched air compressed by the first compressor, and driving the second compressor with the turbine. In still further implementations, the method may include providing a motor drivingly connected to the second compressor, providing a generator connected to the motor, providing a turbine drivingly connected to the generator, supplying the nitrogen-enriched air compressed by the first compressor to the turbine, driving the turbine with the nitrogen-enriched air compressed by the first compressor, driving the generator with the turbine, powering the motor with the output of the generator, and driving the second compressor with the motor.

In some example implementations, the system and method may include providing a backpressure regulator and supplying the incoming air compressed by the pressure intensifier to the backpressure regulator prior to the air separation device.

In other example implementations, the system and method may include providing at least one storage container and storing the nitrogen-enriched air compressed by the compressor in the storage container. The system and method may also include providing at least one regenerative heat exchanger and supplying to the regenerative heat exchanger nitrogen-enriched air from the pressure intensifier and/or second compressor, supplying to regenerative heat exchanger the air compressed by the pressure intensifier and/or second compressor, and cooling, using the regenerative heat exchanger, the air compressed by the pressure intensifier and/or second compressor.

In another example implementation, the system and method may include providing at least one at least one regenerative heat exchanger, supplying a fluid to the regenerative heat exchanger, supplying the regenerative heat exchanger with nitrogen-enriched air output from the pressure intensifier, and cooling the fluid using the regenerative heat exchanger.

The stored gas pressure recovery system may be automatically activated in a situation where the compressor inlet pressure falls below a predetermined level. Or in some further examples, the stored gas pressure recovery system may be automatically activated upon the occurrence of one or more other events, circumstances, and/or measurements.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

Figure 1:
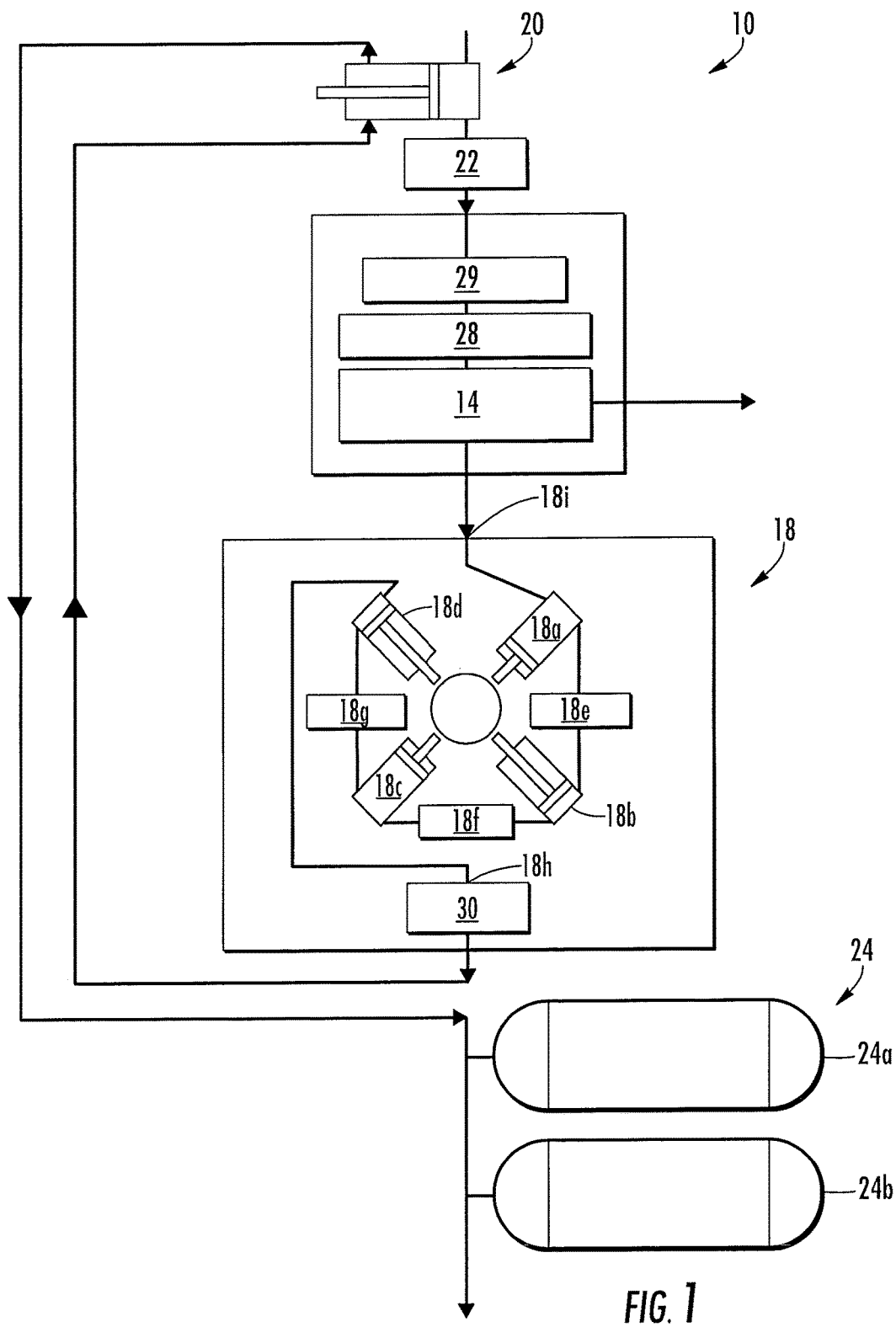
FIG. 1 is a schematic view of a stored gas pressure recovery system according to one or more example implementations of the present disclosure and includes a pressure intensifier.

Each figure shown in this disclosure shows a variation of an aspect of the embodiments presented, and only differences will be discussed in detail.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to a first, second, third or the like should not be taken to imply a specific order, unless otherwise stated. Further, although reference may be made herein to a number of measures, predetermined thresholds and the like such as times, distances, speeds, percentages and the like, according to which aspects of example implementations may operate; unless stated otherwise, any or all of the measures/predetermined thresholds may be configurable. Like reference numerals refer to like elements throughout.

Example implementations of the present disclosure are generally directed to a stored gas pressure recovery system of a vehicle. Example implementations will be primarily described in the context of a vehicle such as transport category commercial aircraft. It should be understood, however, that example implementations may be equally applicable to any of a number of other vehicles such as general aviation aircraft (e.g., airplanes, helicopters), automobiles, trains, watercraft (e.g., boats, ships, submarines) and the like.

FIG. 1 illustrates a system and method, collectively referred to as "system," generally 10, for storing nitrogen-enriched air (NEA), comprising an air separation device (ASM), generally 14, for producing nitrogen-enriched air in the ASM. A first compressor, generally 18, is provided, and the NEA is supplied to first compressor 18. The nitrogen-enriched air is compressed with first compressor 18. A second compressor, which may be a pressure intensifier, generally 20, is provided, and air, such as engine bleed air and/or auxiliary power unit (APU) (not shown) air (hereafter referred individually and collectively to as "incoming air"), is supplied to pressure intensifier 20. System 10 may further include powering pressure intensifier 20 by supplying thereto the NEA compressed by first compressor 18 to compress the incoming air supplied thereto. After compression by pressure intensifier 20, such incoming air is supplied to the ASM 14 at a higher pressure as compared to the pressure of the incoming air entering pressure intensifier 20. Pressure intensifier 20 thus compresses, i.e., pressurizes, the incoming air to a higher pressure suitable for efficient operation of ASM 14 and first compressor 18.

System 10 may include providing a backpressure regulator, generally 22, for receiving and regulating the pressure of the incoming air pressurized by pressure intensifier 20 and supplied to ASM 14. At least one storage container, generally 24, is provided (two such containers 24a and 24b being shown in FIGS. 1-3) for storing the NEA compressed by first compressor 18.

Figure 4A:
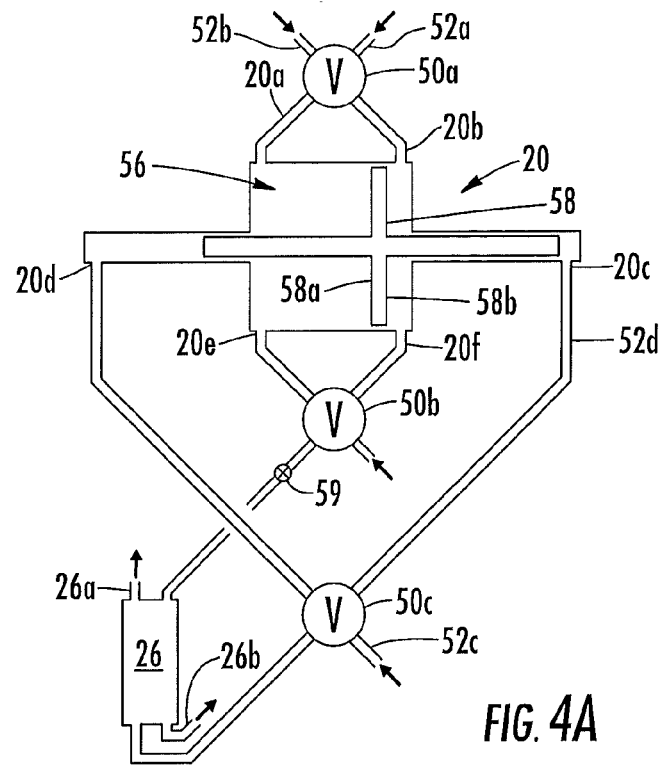
FIG. 4A is a schematic views of an example of a pressure intensifier for use in connection with a stored gas pressure recovery system according to one or more example implementations of the present disclosure, the pressure intensifier being in a first configuration.
Figure 4B:
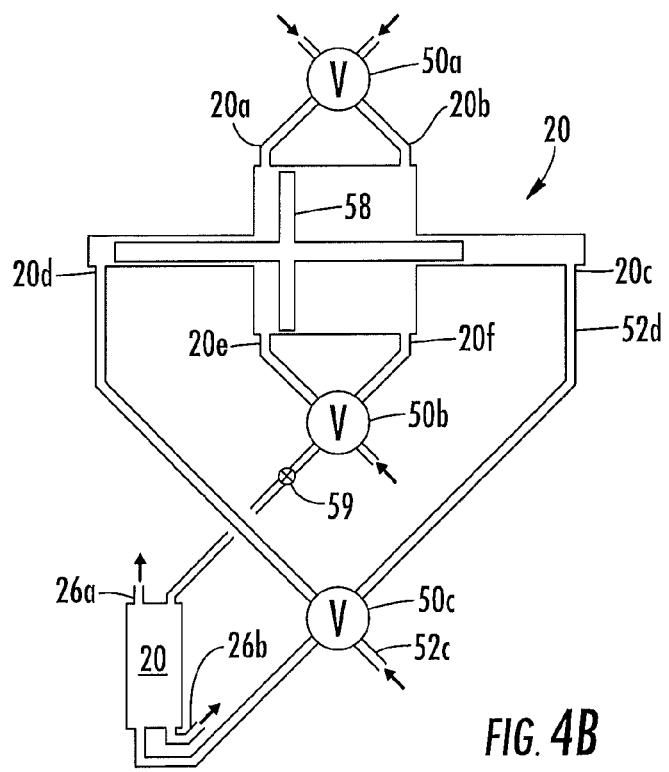
FIG. 4B is a schematic views the pressure intensifier of FIG. 4A in a second configuration.

As shown in FIGS. 4A and 4B, at least one heat exchanger, which could be a regenerative heat exchanger, generally 26, may be provided to which the NEA is supplied after the NEA exits pressure intensifier 20. Regenerative heat exchanger 26 also receives the incoming air compressed by pressure intensifier 20 and may be configured to cool such compressed incoming air using the NEA passing through regenerative heat exchanger 26. Accordingly, regenerative heat exchanger 26 may facilitate the balancing of heat using the NEA (which may experience cooling due to its expansion in pressure intensifier 20) exiting pressure intensifier 20 as the NEA is in route to storage in storage containers 24a and 24b. It is to be understood that one or more regenerative heat exchangers 26 could also be used to heat (using the heat of the compressed incoming air) and/or cool (through the absorption of heat by the NEA which may experience cooling due to its expansion in pressure intensifier 20) other fluids, such as ventilation air, potable water, non-potable water, hydraulic fluid, etc.

More specifically, as shown in FIG. 4A, valves 50a, 50b, and 50c may be used in connection with pressure intensifier 20 and regenerative heat exchanger 26. One or more of valves 50a, 50b, and 50c may be electronically operated, solenoid operated and/or manually operated and may be connected to and under the control of a processor (not shown). As shown in FIG. 4A, valve 50a is operably connected to selectively accept an inlet flow of ambient air via conduit 52a and an inlet flow through conduit 52b from engine bleed air and/or from an APU. Ambient air is supplied from valve 50a through inlet 20a to chamber, generally 56, to a first side 54a of a piston 58 within pressure intensifier 20, and engine bleed air and/or from an APU is supplied from valve 50a through inlet 20b to chamber 56 on the other side 54b of piston 58. Valve 50c, which is connected by conduit 52c to the compressed NEA and by conduit 52d to the port 20c of pressure intensifier 20, directs the compressed NEA to port 20c. This introduction of the pressurized (compressed) NEA to port 20e drives piston 58 to the right (as shown in FIG. 4A) and to the position shown in FIG. 4B. In so doing, piston 58 compresses the engine bleed air/APU incoming air on the left side of piston 58 (adjacent side 58a of piston 58), which is then output from port 20d of pressure intensifier 20 to valve 50c. Upon piston 58 approaching and/or being at the end at the leftmost end of its stroke, valve 50c selectively redirects the flow of pressurized NEA to the port 20d, and valve 50a directs the engine bleed air/APU incoming air to the right of piston 58 (adjacent side 58b of piston 58), and the NEA drives piston 58, to a position as shown in FIG. 4A. This cycle may continue repeatedly during operation of pressure intensifier 20.

Valve 50c is selectively actuatable to not only supply the pressurized NEA to pressure intensifier 20 but to also divert such NEA to regenerative heat exchanger 26 after such NEA has expanded, and hence cooled, in the driving of drive piston 58. Upon passing through regenerative heat exchanger 26, wherein the NEA absorbs heat from the bleed air/APU air compressed (pressurized) by pressure intensifier 20, the NEA goes to containers 24a and 24b. Valve 50b is interposed between pressure intensifier 20 and regenerative heat exchanger 26 and selectively receives the bleed air/APU incoming air pressurized by pressure intensifier 20 and supplies it to regenerative heat exchanger 26, where, as discussed above, such pressurized incoming air is cooled due to the heat absorbed therein by the expanded NEA passing therethrough. The pressurized incoming air is then supplied from the regenerative heat exchanger 26 to ASM 14. A backpressure regulator 59 may be provided in conduit 52e between valve 50b and regenerative heat exchanger 26, upstream of ASM 14.

In one example implementation of a system and a method according to the present disclosure, which example should not be interpreted as placing limitations on other implementations of the present disclosure, the incoming air to pressure intensifier may be approximately in the range of 15 to 25 psig when the aircraft's engines are at idle, and if the engines are at operational in-flight power, such pressure may be approximately in the 70 to 80 psig range. If an APU is used, the pressure of incoming air may by approximately in the range of 25 to 35 psig. In one example implementation, ASM 14 may include pressure regulator 28 being set in the vicinity of 60 psia. Accordingly, when the pressure of incoming air is lower than the set point of pressure regulator 28, it may be desirable to operate pressure intensifier 20, which is capable of boosting the pressure of the incoming air to the range at or near the set point of pressure regulator 28.

Upon leaving ASM 14, wherein the NEA is produced, the pressure of such NEA may be in the range of approximately 45 to 60 psia, which is then supplied to compressor 18, where the NEA is compressed to approximately 2900 to 3000 pisa. The pressurized NEA is supplied to pressure intensifier 20 to drive piston 58 as discussed above, pressurizing the incoming air supplied to pressure intensifier 20. The spent, expanded (and consequently cooled) NEA then goes to the regenerative heat exchanger 26, as does also the incoming air pressurized by the pressure intensifier 20, wherein the NEA absorbs heat from and cools the pressurized incoming air. After leaving the regenerative heat exchanger 26, the NEA goes to the storage containers 24a and 24b, which, when fully charged with pressurized NEA are at approximately 2900 to 3000 psia.

One or more pressure regulators (not shown) may be provided at one or more of storage containers 24a and 24b in order to control the pressure of the NEA supplied therefrom to the fuel tanks of an aircraft or other vehicle, vessel, industrial application, etc., and in the case of aircraft, at the required rate for different phases of flight. In one example, first compressor 18 may be a generally constant volume flow rate device that sets the flow of the NEA from ASM 14, meaning it produces a lower mass flow rate when the inlet pressure of incoming air to compressor 18 is relatively low. A pressure regulator 28, which may be preceded by a filter 29, may be provided in ASM 14 that limits the maximum pressure of incoming air into compressor 18. However, in certain applications, such as during the aircraft engine's idle and/or operation of an APU (not shown), the pressure of incoming air is significantly lower than the setting of pressure regulator 28 of ASM 14, and, consequently, the NEA mass flow rate is proportionally reduced.

Figure 2:
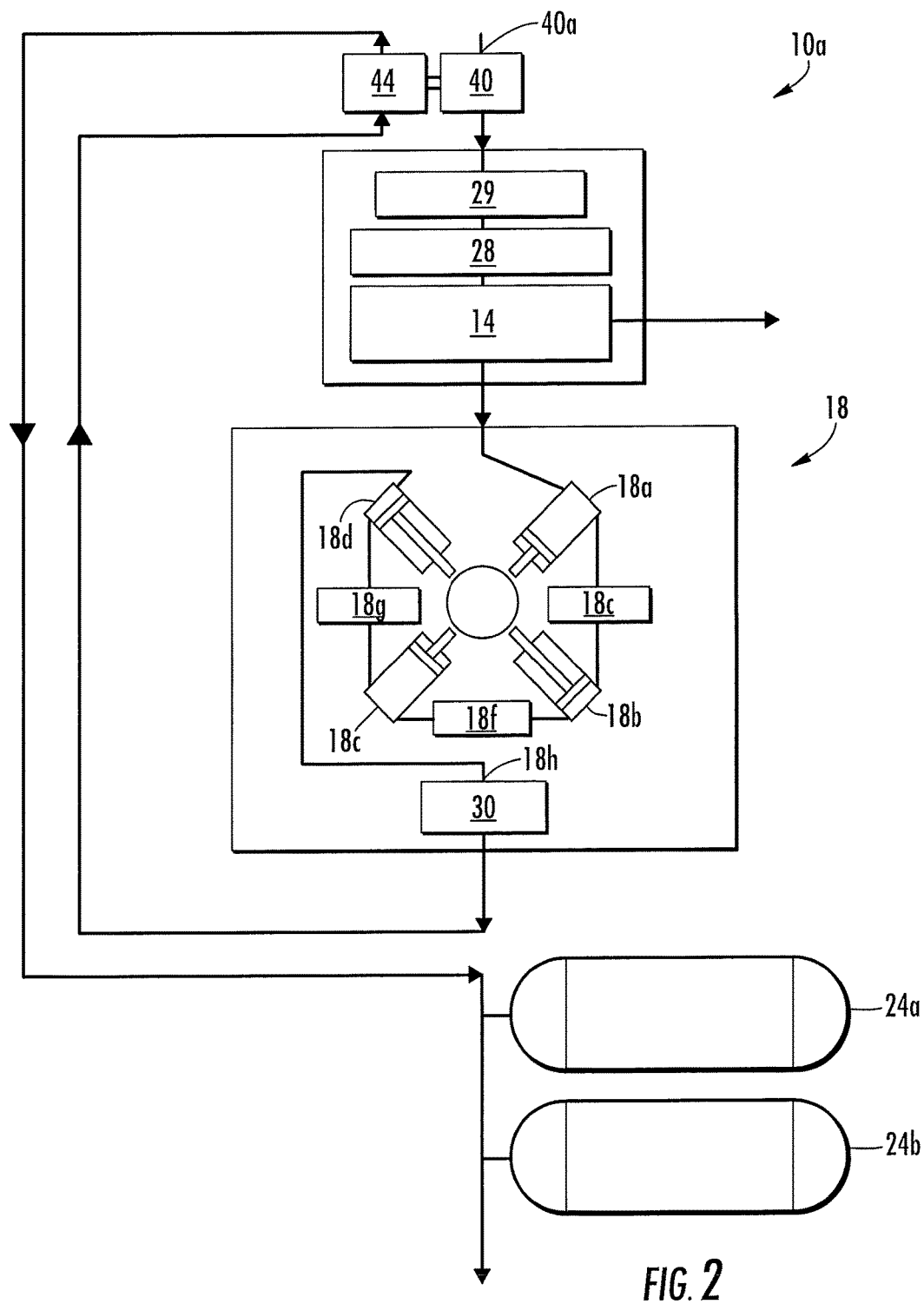
FIG. 2 is a schematic view of a stored gas pressure recovery system according to one or more example implementations of the present disclosure and includes a turbine and compressor.
Figure 3:
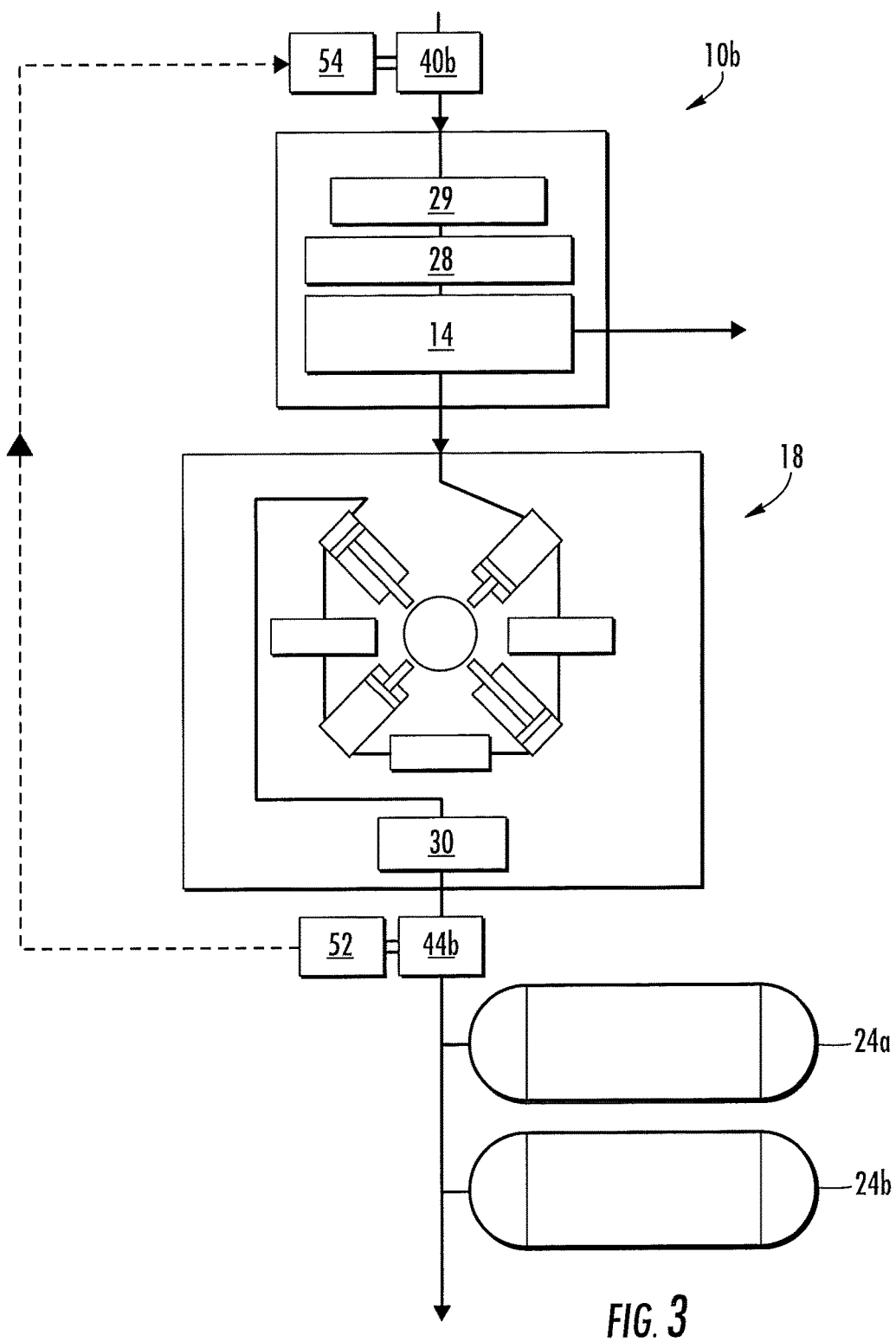
FIG. 3 is a schematic view of a stored gas pressure recovery system according to one or more example implementations of the present disclosure and includes a turbine, generator, motor and compressor.

In an example implementation storage compressor 18, the required overall pressure ratio is such that multiple pressurization cylinder stages (18a, 18b, 18c, and 18d) are required. Cylinder stages 18a, 18b, 18c, and 18d may be arranged in a circular fashion as shown in FIGS. 1-3 interposed with intercoolers 18e, 18f, and 18g, and be configured such that in first compressor 18 the opposing cylinders, e.g., stages 18a and 18c, and 18b and 18d, move in opposite directions from each other. A back-pressure regulator 30 at the outlet 18h of first compressor 18 ensures that the discharge pressure of the NEA at the last cylinder stage is constant, even if the storage containers 24a and 24b are not fully pressurized. The pressure ratios in each cylinder stage 18a, 18b, 18c, and 18d may be designed such that upon the inlet pressures being approximately at the setting of pressure regulator 28 of ASM 14, the forces of any two opposing cylinder stages are substantially balanced.

Upon the pressure of the NEA at inlet 18i of first compressor being significantly lower than set point of pressure regulator 28 of ASM 14, then the last cylinder stage 18d of first compressor 18 may be required to perform more work than normal, potentially resulting in unbalanced forces that may cause the vibration level of first compressor 18 to increase. When the stored NEA exits the compressor back-pressure regulator 28, it expands to the generally the pressure of the NEA gas stored, if any, in storage containers 24a and 24b as it enters such storage containers 24a and 24b.

In FIG. 2, another example implementation of the present disclosure is illustrated and includes a system and method, collectively referred to as "system," generally, 10a, which is similar in certain respects to the system 10 discussed above and incorporates certain of the same components (which bear the same reference characters noted above) and method steps of system 10. However, instead of having a pressure intensifier system 20, system 10a includes a second compressor, generally 40, in addition to first compressor 18. As in system 10, the NEA is compressed with first compressor 18. A turbine, generally 44, is drivingly connected to second compressor 40, and the incoming air is supplied to second compressor 40 at inlet 40a. The NEA compressed by first compressor 18 is supplied to and expands within and drives turbine 44, which, in turn, drives second compressor 40. Second compressor 40 compresses the incoming air to a pressure suitable for efficient operation of ASM 14 and first compressor 18. Thus, the combination of turbine 44 and second compressor 40 is used instead of pressure intensifier 20 to compress the incoming air. It is to be understood, however, that pressure intensifier 20 could be used in addition to the combination of turbine 44 and second compressor 40, in series or in parallel, to compress the incoming air, if desired.

In FIG. 3, a further example implementation of the present disclosure is illustrated and includes a system and method, collectively referred to as "system," generally, 10b, which is similar in certain respects to the systems 10 and 10a discussed above and incorporates certain of the same components (which bear the same reference characters noted above) and method steps of systems 10 and 10a. However, instead of having a pressure intensifier system 20, a turbine 44 drivingly connected to second compressor 40b, a turbine, generally 44b, is drivingly connected to an electrical generator or alternator, referred to collectively as "generator," 52. The NEA compressed by first compressor 18 is supplied to and expands within and drives turbine 44a, which, in turn, drives generator 52. Generator 52 produces electricity which powers a motor, generally 54, which is drivingly connected to second compressor 40a. Second compressor 40a compresses the incoming air to a pressure suitable for efficient operation of ASM 14 and first compressor 18. Motor 54 could be driven by an alternate source of electricity (not shown) in addition to or instead of generator 52, if desired. Accordingly, the combination of turbine 44b, generator 52, motor 54, and second compressor 40a is used to compress the incoming air. It is to be understood, however, that pressure intensifier 20 could be used in addition to the combination of turbine 44b and second compressor 40b and or the combination of turbine 44b, generator 52, motor 54, and second compressor 40b, in series or in parallel, to compress the incoming air, if desired.

Figure 5:
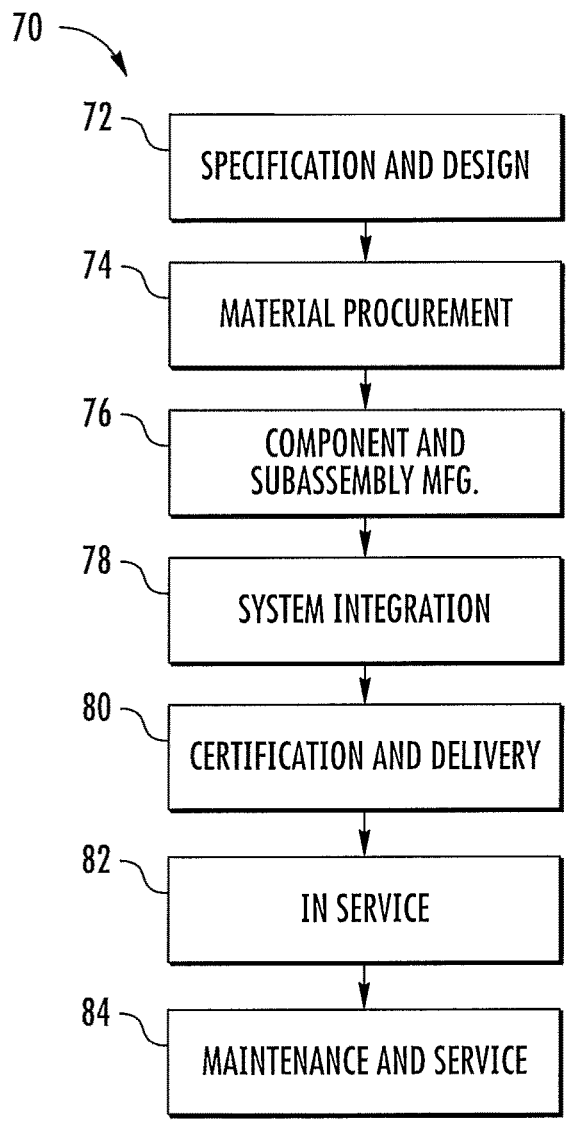
FIG. 5 is a flow diagram of an example aircraft production and service methodology.
Figure 6:
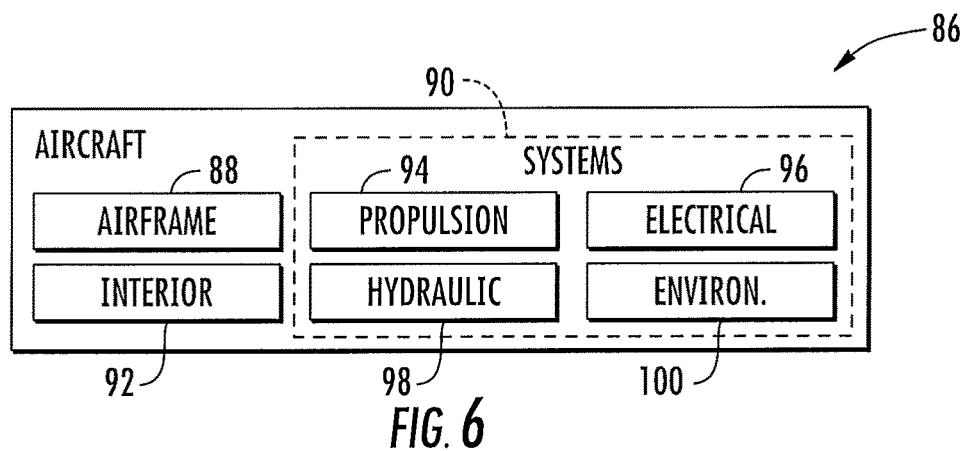
FIG. 6 is a block diagram of an example aircraft.

Example embodiments of the disclosure may find use in a variety of potential applications, particularly in the transportation industry, including for example, aerospace, marine and automotive applications. Thus, referring now to FIGS. 5 and 6, example embodiments may be used in the context of an aircraft manufacturing and service method 70 as shown in FIG. 5, and an aircraft 86 as shown in FIG. 6. During pre-production, example method may include specification and design 72 of the aircraft and material procurement 74. In one example, specification and design of the aircraft may include technology development and product definition, which may in turn include a test and evaluation component in which example embodiments may be employed. Example embodiments may also be employed in model scale test during technology and product development testing such as, for example, on a test model and/or on the walls or other mountable locations of a test facility (e.g., wind tunnel).

During production, component and subassembly manufacturing 76 and system integration 78 of the aircraft takes place. Thereafter, the aircraft may go through certification and delivery 80 in order to be placed in service 82. While in service by a customer, the aircraft is scheduled for routine maintenance and service 84 (which may also include modification, reconfiguration, refurbishment, and so on).

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization and so on.

As shown in FIG. 6, the aircraft 86 produced by example method 70 may include an airframe 88 with a plurality of systems 90 and an interior 92. Examples of high-level systems may include one or more of a propulsion system 94, an electrical system 96, a hydraulic system 98 or an environmental system 100. Any number of other systems may be included. Although an aerospace example is shown, the principles of the present disclosure may be applied to other industries, such as the automotive industry.

As suggested above, the apparatus and methods embodied herein may be employed during any one or more of the stages of the production and service method 70. For example, components or subassemblies corresponding to production process 76 may be fabricated or manufactured in a manner similar to components or subassemblies produced while the aircraft 86 is in service. Also, one or more apparatus embodiments, method embodiments or a combination thereof may be utilized during the production stages 76 and 78, for example, by substantially expediting assembly of or reducing the cost of an aircraft. Similarly, one or more of apparatus embodiments, method embodiments or a combination thereof may be utilized while the aircraft is in service, for example and without limitation, to maintenance and service 84.

It is to be understood that the various components discussed herein that are in fluid communication with one another, including without limitation, ASM 14, compressor 18, pressure intensifier 20, back pressure regulators 22, 30, regenerative heat exchanger 26, turbines 44, 44*b*, and second compressors 40, 40*b* may be connected together for fluid transfer via piping, conduit, tubing, hoses, lines, and/or other components as desired and/or as will be apparent to one skilled in the art.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for storing nitrogen-enriched air, comprising:
providing an air separation device;
producing nitrogen-enriched air in the air separation device;
providing a first compressor;
supplying the nitrogen-enriched air to the first compressor;
compressing the nitrogen-enriched air with the first compressor;
providing a second compressor;
supplying air to the second compressor;
powering the second compressor by supplying thereto the nitrogen-enriched air compressed by the first compressor;
compressing, using the second compressor, the air supplied thereto; and
supplying the air compressed by the second compressor to the air separation device.

2. The method as set forth in claim 1, wherein the providing of the second compressor includes providing a pressure intensifier.

3. The method as set forth in claim 2, further comprising:
providing a backpressure regulator; and
supplying the air compressed by the pressure intensifier to the backpressure regulator prior to the air separation device.

4. The method as set forth in claim 1, further comprising:
providing at least one storage container; and
storing the nitrogen-enriched air compressed by the first compressor in the storage container.

5. The method as set forth in claim 2, further comprising:
providing at least one regenerative heat exchanger;
supplying to the regenerative heat exchanger nitrogen-enriched air from the pressure intensifier;
supplying to regenerative heat exchanger the air compressed by the pressure intensifier; and
cooling, using the regenerative heat exchanger, the air compressed by the pressure intensifier.

6. The method as set forth in claim 2, further comprising:
providing at least one regenerative heat exchanger;
supplying a fluid to the regenerative heat exchanger;
supplying the regenerative heat exchanger with nitrogen-enriched air output from the pressure intensifier; and
cooling the fluid using the regenerative heat exchanger.

7. The method as set forth in claim 2, further comprising:
providing at least one regenerative heat exchanger;
supplying a fluid to the regenerative heat exchanger;
supplying the regenerative heat exchanger with the air compressed by the pressure intensifier; and
heating the fluid using the regenerative heat exchanger.

8. The method as set forth in claim 1, further comprising:
providing a turbine in fluid communication with the first compressor and drivingly connected to the second compressor;
supplying the nitrogen-enriched air compressed by the first compressor to the turbine;
driving the turbine with the nitrogen-enriched air compressed by the first compressor; and
driving the second compressor with the turbine.

9. The method as set forth in claim 1, further comprising:
providing a motor drivingly connected to the second compressor;
providing a generator connected to the motor;
providing a turbine in fluid communication with the first compressor and drivingly connected to the generator;
supplying the nitrogen-enriched air compressed by the first compressor to the turbine;

driving the turbine with the nitrogen-enriched air compressed by the first compressor;
driving the generator with the turbine;
powering the motor with the output of the generator; and
driving the second compressor with the motor.

10. A system for creating nitrogen-enriched air from an incoming air flow, the system comprising:
an air separation device that receives the incoming air and produces nitrogen-enriched air therefrom;
a first compressor in fluid communication with the air separation device that receives and compresses the nitrogen-enriched air produced by the air separation device;
a pressure intensifier in fluid communication with the air separation device;
wherein the pressure intensifier is powered by the compressed nitrogen-enriched air; and
wherein the pressure intensifier compresses the incoming air prior to such incoming air being received by the air separation device.

11. A system as set forth by claim 10, further comprising:
at least one storage container for storing the compressed nitrogen-enriched air; and
wherein the storage container stores the compressed nitrogen-enriched air after the compressed nitrogen-enriched air has powered the pressure intensifier.

12. A system as set forth by claim 10, further comprising:
a backpressure regulator; and
wherein the incoming air compressed by the pressure intensifier passes through the backpressure regulator prior to being received by the air separation device.

13. The system as set forth in claim 10, further comprising:
at least one regenerative heat exchanger;
wherein the nitrogen-enriched air from the pressure intensifier and the incoming air compressed by the pressure intensifier are supplied to the regenerative heat exchanger; and
wherein the regenerative heat exchanger cools the incoming air compressed by the pressure intensifier.

14. The system as set forth in claim 10, further comprising:
at least one regenerative heat exchanger;
wherein the nitrogen-enriched air from the pressure intensifier and the incoming air compressed by the pressure intensifier are supplied to the regenerative heat exchanger; and
wherein the regenerative heat exchanger heats the nitrogen-enriched air from the pressure intensifier.

15. A system for creating nitrogen-enriched air from an incoming air flow, the system comprising:
an air separation device that receives the incoming air and produces nitrogen-enriched air therefrom;
a first compressor in fluid communication with the air separation device that receives and compresses the nitrogen-enriched air produced by the air separation device;
a second compressor in fluid communication with the air separation device;
a turbine in fluid communication with the first compressor and drivingly connected to the second compressor;
wherein the compressed nitrogen-enriched air drives the turbine;
wherein the turbine drives the second compressor; and
wherein the second compressor compresses the incoming air prior to such incoming air being received by the air separation device.

16. A system as set forth by claim 15, further comprising:
at least one storage container for storing the compressed nitrogen-enriched air; and
wherein the storage container stores the compressed nitrogen-enriched air after the compressed nitrogen-enriched air has powered the turbine.

17. The system as set forth in claim 15, further comprising:
at least one regenerative heat exchanger;
wherein the nitrogen-enriched air from the turbine and the incoming air compressed by the second compressor are supplied to the regenerative heat exchanger; and
wherein the regenerative heat exchanger cools the incoming air compressed by the second compressor.

18. A system for creating nitrogen-enriched air from an incoming air flow, the system comprising:
an air separation device that receives the incoming air and produces nitrogen-enriched air therefrom;
a first compressor in fluid communication with the air separation device that receives and compresses the nitrogen-enriched air produced by the air separation device;
a second compressor in fluid communication with the air separation device;
an electric motor drivingly connected to the second compressor;
an electrical generator;
a turbine in fluid communication with the first compressor and drivingly connected to the generator;
wherein the compressed nitrogen-enriched air drives the turbine;
wherein the turbine drives the generator;
wherein the generator electrically powers the motor;
wherein the motor drives the second compressor; and
wherein the second compressor compresses the incoming air prior to such incoming air being received by the air separation device.

19. A system as set forth by claim 18, further comprising:
at least one storage container for storing the compressed nitrogen-enriched air; and
wherein the storage container stores the compressed nitrogen-enriched air after the compressed nitrogen-enriched air has powered the turbine.

20. The system as set forth in claim 18, further comprising:
at least one regenerative heat exchanger;
wherein the nitrogen-enriched air from the turbine and the incoming air compressed by the second compressor are supplied to the regenerative heat exchanger; and
wherein the regenerative heat exchanger cools the incoming air compressed by the second compressor.

* * * * *